(12) United States Patent
Nagai (10) Patent No.: US 8,600,632 B2
(45) Date of Patent: Dec. 3, 2013

(54) VEHICLE CONTROL APPARATUS

(75) Inventor: Tadayuki Nagai, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 418 days.

(21) Appl. No.: 13/126,228

(22) PCT Filed: Mar. 29, 2010

(86) PCT No.: PCT/JP2010/055605
§ 371 (c)(1),
(2), (4) Date: Apr. 27, 2011

(87) PCT Pub. No.: WO2011/121711
PCT Pub. Date: Oct. 6, 2011

(65) Prior Publication Data
US 2012/0035816 A1  Feb. 9, 2012

(51) Int. Cl.
*G06F 7/00* (2006.01)
*G06F 17/00* (2006.01)
*G06F 19/00* (2011.01)

(52) U.S. Cl.
USPC ............ 701/54; 701/51; 192/54.1; 477/52; 123/311

(58) Field of Classification Search
USPC ......... 701/51, 54; 192/54.1; 477/52; 123/311
See application file for complete search history.

(56) References Cited

U.S. PATENT DOCUMENTS

| | | | | |
|---|---|---|---|---|
| 4,114,585 A | * | 9/1978 | Dawkins | 123/311 |
| 4,781,022 A | * | 11/1988 | Hayashi et al. | 60/489 |
| 5,819,702 A | * | 10/1998 | Mendler | 123/311 |
| 7,286,922 B1 | * | 10/2007 | Fischer et al. | 701/51 |
| 7,292,927 B2 | * | 11/2007 | Yasui et al. | 701/103 |
| 2003/0000485 A1 | * | 1/2003 | Tomatsuri et al. | 123/41 E |
| 2012/0271533 A1 | * | 10/2012 | Shishime | 701/105 |
| 2013/0055990 A1 | * | 3/2013 | Kamada | 123/48 R |

FOREIGN PATENT DOCUMENTS

DE   102012007657 A1 * 10/2012
JP   8 150859       6/1996

(Continued)

OTHER PUBLICATIONS

Digital Measuring System for Monitoring Motor Shaft Parameters on Ships; Dzapo, H. ; Stare, Z. ; Bobanac, N.; Instrumentation and Measurement, IEEE Transactions on; vol. 58 , Issue: 10; Digital Object Identifier: 10.1109/TIM.2009.2019316; Publication Year: 2009 , pp. 3702-3712.*

(Continued)

*Primary Examiner* — Cuong H Nguyen
(74) *Attorney, Agent, or Firm* — Oblon, Spivak, McClelland, Maier & Neustadt, L.L.P.

(57) ABSTRACT

A vehicle control apparatus (100) for controlling a vehicle (10) provided, as a drive system, with: an internal combustion engine (200) in which a compression ratio is variable; and a transmission (500) which has a torque converter (300) and a lockup mechanism (400) between an input shaft and an engine output shaft (205) of the internal combustion engine and which can change a ratio between a rotational speed of the input shaft and a rotational speed (Nout) of an output shaft coupled with an axle, is provided with: a first controlling device for changing an operating state of the lockup mechanism in accordance with an operating condition of the vehicle; and a second controlling device for changing the compression ratio in at least one portion of a case where the operating state is changed.

9 Claims, 6 Drawing Sheets

(56) References Cited

FOREIGN PATENT DOCUMENTS

| JP | 11 117785 | | 4/1999 |
|---|---|---|---|
| JP | 2004-249213 | * | 8/2004 |
| JP | 02006170163 A | * | 6/2006 |
| JP | 02009108730 A | * | 5/2009 |
| JP | 02012219761 A | * | 11/2012 |
| JP | 2013122226 A | * | 6/2013 |
| WO | WO 2013061684 A1 | * | 5/2013 |

OTHER PUBLICATIONS

Virtual Sensors for Automotive Engine Sensors Fault Diagnosis in Second-Order Sliding Modes; Ahmed, Q. ; Bhatti, A.I. ; Iqbal, M. Sensors Journal, IEEE; vol. 11 , Issue: 9; Digital Object Identifier: 10.1109/JSEN.2011.2105471; Publication Year: 2011 , pp. 1832-1840.*

International Search Report Issued Apr. 20, 2010 in PCT/JP10/055605 filed Mar. 29, 2010.

* cited by examiner

VEHICLE CONTROL APPARATUS

TECHNICAL FIELD

The present invention relates to a vehicle control apparatus for controlling a vehicle which is provided with an internal combustion engine in which a compression ratio is variable and a transmission having a lockup function.

BACKGROUND ART

As an apparatus for controlling a transmission having a lockup function, there has been suggested an apparatus for setting a lockup area on the basis of a lockup line defined by a vehicle speed and a throttle opening degree (e.g. refer to a patent document 1). According to the apparatus disclosed in the patent document 1, the lockup is performed in an area in which the torque variation of an engine is not large and in which there is no booming noise even in the lockup.

PRIOR ART DOCUMENT

Patent Document

Patent document 1: Japanese Patent Application Laid Open No. Hei 8-150859

DISCLOSURE OF INVENTION

Subject to be Solved by the Invention

As for lockup control in a vehicle provided with an internal combustion engine of a variable compression ratio type, it has not been discussed enough so far. Therefore, even if a technical idea disclosed in the patent document 1 is applied, there is nothing but to associate the operating condition of the vehicle with the compression ratio in consideration of a power performance, fuel consumption and knocking-resistant performance or the like, and to perform the lockup control in consideration of the torque variation and the booming noise or the like, with the compression ratio as a default value.

However, according to what the applicant of the present application has newly found, there is a significant relation between the compression ratio and the lockup area in the internal combustion engine in which the compression ratio can be changed. Therefore, in the aforementioned technical idea in which there is nothing but to independently control both the compression ratio and the lockup area without consideration of this type of relation, there can be room for improvement in fuel consumption, drivability, or the like.

In view of the aforementioned problems, it is therefore an object of the present invention to provide a vehicle control apparatus capable of making the lockup control of a lockup mechanism and the control of the compression ratio cooperate with each other, in the vehicle provided with the internal combustion engine of a variable compression ratio type.

Means for Solving the Subject

The above object of the present invention can be achieved by a first vehicle control apparatus for controlling a vehicle provided, as a drive system, with: an internal combustion engine in which a compression ratio is variable; and a transmission which has a torque converter and a lockup mechanism between an input shaft and an engine output shaft of the internal combustion engine and which can change a ratio between a rotational speed of the input shaft and a rotational speed of an output shaft coupled with an axle, said vehicle control apparatus provided with: a first controlling device for changing an operating state of the lockup mechanism in accordance with an operating condition of the vehicle; and a second controlling device for changing the compression ratio in at least one portion of a case where the operating state is changed.

The vehicle of the present invention is provided with the internal combustion engine and the transmission.

The internal combustion engine includes in effect an engine for generating power by the combustion of fuel, and particularly an engine capable of changing the compression ratio (e.g. defined as ((stroke volume+combustion chamber volume)/combustion chamber volume) or the like) in a range set in advance in a binary manner, in multiple stages or steps, or continuously (seamlessly).

Here, there can be various aspects of making the compression ratio variable, including known and unknown aspects; however, the vehicle control apparatus of the present invention can exert its virtue, regardless of a physical structure for making the compression ratio variable. Therefore, the variable compression ratio can be led by any physical structure of the internal combustion engine.

For example, the internal combustion engine may make the compression ratio variable by controlling the valve opening period (IVO: Intake Valve Opening) or valve closing period of an intake valve. In this case, for example, the intake valve may be maintained in a valve opening state for a short time after a bottom dead center (BDC) in an intake stroke, and the compression ratio may be made lower than in the normal case due to the blowing back of the intake. Moreover, the internal combustion engine may make the compression ratio variable by having a structure for changing the top dead center (TDC) of the piston or providing such a mechanism and by a change in top dead center position (i.e. a change in both stroke volume and combustion chamber volume). Alternatively, the internal combustion engine may make the compression ratio variable by having a structure for changing the position of a cylinder head or providing such a mechanism and by a change in cylinder head position (i.e. a change in combustion chamber volume).

The transmission of the present invention is an apparatus capable of changing the rotational speed ratio between the input and output shafts (i.e. transmission gear ratio) in a binary manner, in multiple stages or steps, or continuously. As a preferred form, the transmission has a plurality of engaging apparatuses and a differential mechanism, and it is a so-called ECT (Electronic Controlled Transmission) in which the engagement state of the engaging apparatuses is electrically controlled.

The transmission of the present invention is provided with the torque converter and the lockup mechanism between the input shaft and the engine output shaft of the internal combustion engine (e.g. a crankshaft and a shaft connected to the crankshaft).

As long as the lockup mechanism can adopt a lockup-off state in which lockup is not performed and a lockup-on state in which the lockup is performed at least as its operating state, even if they are changed in a binary manner, the lockup mechanism may be constructed to establish one or a plurality of intermediate semi-lockup states among them, by sliding the engagement elements of the engaging apparatus in accordance with an engagement hydraulic pressure or the like, as occasion demands. In any case, the lockup mechanism can realize a higher transmission efficiency than power transmission using the fluid resistance of an ATF because the engine output shaft and the input shaft of the transmission can be directly connected in the lockup-on state.

The first vehicle control apparatus of the present invention is an apparatus for controlling the vehicle of the present invention described above, and it can adopt a form of various computer systems such as various controllers or microcomputer apparatuses, various processing units such as a single or a plurality of ECUs (Electronic Controlled Unit), which can appropriately include one or more CPUs (Central Processing Unit), MPUs (Micro Processing Unit), various processors or various controllers, or various memory devices such as a ROM (Read Only Memory), a RAM (Random Access Memory), a buffer memory or a flash memory, and the like.

According to the vehicle control apparatus of the present invention, the operating state of the lockup mechanism is changed in accordance with the operating condition of the vehicle, by the first controlling device.

Here, the operating condition of the vehicle means various conditions associated with the degree of necessity of the lockup in advance (incidentally, in the case of a simple expression of "lockup", it means the operating state is changed to or maintained in the lockup-on state). For example, it means a load correspondence value, a vehicle speed correspondence value, and the like of the internal combustion engine.

Incidentally, the "load correspondence value" is a concept including a value which can correspond to the load state of the internal combustion engine in a one-to-one, one-to-many, many-to-one or many-to-many manner, and it preferably means a throttle opening degree, an intake air amount, an accelerator opening degree, or the like. Moreover, the "vehicle speed correspondence value" is a concept including a value which can correspond to the vehicle speed in a one-to-one, one-to-many, many-to-one or many-to-many manner, and it preferably means the vehicle speed, an input shaft rotational speed or an output shaft rotational speed of the transmission, or the like.

The virtue of a lockup effect by the lockup mechanism is mainly an improvement in power transmission efficiency by the direct connection of a power shaft without via the torque converter, and plainly speaking, it is an improvement in fuel consumption of the internal combustion engine. However, the direct connection effect of the power shaft also has an effect of reducing drivability, such as a point that torque variation generated on the internal combustion engine side is transmitted to the axle side without relaxation, or a point that a so-called booming noise is generated. On a practical operation side, the lockup is performed in the operating condition of the vehicle in which they can be included in an acceptable range.

On the other hand, in the present invention, the compression ratio of the internal combustion engine can be also changed in accordance with the operating condition of the vehicle, as occasion demands. From the viewpoint of combustion efficiency and driving force ensuring, it is better that the compression ratio is high; however, from the viewpoint of practical operation side, the high compression ratio can cause knocking and torque variation. Therefore, even as for the compression ratio, the correlation with the operating condition of the vehicle is also defined such that the degree of the knocking and the torque variation is included in an acceptable range.

By the way, both an improvement in mechanical transmission efficiency by the lockup effect and an improvement in fuel efficiency by the high compression ratio are elements that influence a fuel consumption performance as the entire vehicle. Conventionally, it is not considered how they influence each other, and therefore, they have merely been optimized for each.

Here, the applicant of the present application has newly found that the fuel consumption performance and other various performances are optimized by making them cooperate with each other.

For example, the applicant of the present application has newly found that the lockup area (or area in which lockup on can be performed from a practical viewpoint), which has been optimized only for the compression ratio determined for the reasons of the internal combustion engine side in advance, can be enlarged by changing the compression ratio by using that the compression ratio is variable.

In other words, according to the first vehicle control apparatus of the present invention, the second controlling device changes the compression ratio in at least one portion of the case where the operating state of the lockup mechanism is changed.

Within the conventional technical idea, the compression ratio is not influenced by the operating state of the lockup mechanism; however, it is possible to further improve the fuel consumption by treating the compression ratio as a type of control element in accordance with the operating state of the lockup mechanism.

As described above, according to the first vehicle control apparatus of the present invention, the fuel consumption performance can be optimized by finding practical usefulness in the mutual cooperation between the lockup effect and the variable compression ratio effect.

Incidentally, the cooperation of the first controlling device and the second controlling device may be performed while each or both of the first controlling device and the second controlling device performs operation selection individually and specifically at each time. Alternatively, the cooperation may be performed as if they kept independency in appearance, on the basis of a control map or the like made on the experimental, experiential, theoretical, or simulation basis or the like in advance. In any case, there is no change in the mutual cooperation between the control of the compression ratio and the lockup control.

In one aspect of the first vehicle control apparatus of the present invention, the second controlling device reduces the compression ratio if the operating state is changed into a lockup-on state in an area in which a load correspondence value of the internal combustion engine is less than a reference value as the operating condition.

According to this aspect, the compression ratio is reduced by the second controlling device if the operating state of the lockup mechanism is changed into the lockup-on state in the area in which the load correspondence value of the internal combustion engine is less than the reference value, or plainly speaking, in the area in which the compression ratio can be set on a relatively high compression ratio side (or the compression ratio can have a part to reduce).

Namely, according to this aspect, a lockup-on area in which the lockup effect by the lockup mechanism is in an effective state is enlarged by a measure of reducing the compression ratio. The reduction in the compression ratio means the relaxation of the torque variation, so that the operating state, which has been able to adopt only the lockup-off state, can adopt the lockup state by reducing the compression ratio. Thus, it is remarkably effective in the state that the lockup is desired.

In another aspect of the first vehicle control apparatus of the present invention, the first controlling device changes the operating state of the lockup mechanism such that a state element including at least one of vibration and noise which occur in the vehicle satisfies a predetermined requirement.

According to this aspect, the operating state of the lockup mechanism is changed, as described above, such that the state element including at least one of the vibration and the noise satisfies the predetermined requirement.

Here, the "predetermined requirement" means being included in the aforementioned acceptable range or the like, and it preferably means a requirement determined not to cause the reduction in drivability in terms of vehicle movement.

Thus, with the transition into the lockup-on state, only the benefits associated with the improvement in fuel consumption are received, so that it is beneficial.

In one aspect of the first vehicle control apparatus of the present invention in which the operating state of the lockup mechanism is changed such that the state element satisfies the predetermined requirement, the first controlling device changes the operating state on the basis of a predicted value of an efficiency in the drive system if the compression ratio is reduced to an acceptable value determined such that the state element satisfies the predetermined requirement in an area in which a load correspondence value of the internal combustion engine is less than a reference value.

According to this aspect, the operating state of the lockup mechanism is changed on the basis of the predicted value of the efficiency in the drive system when the compression ratio is reduced to the acceptable value determined such that the state element satisfies the predetermined requirement. Therefore, it is possible to numerically recognize the benefit that the compression ratio is reduced, so that it is beneficial.

Further to that, the predicted value of the efficiency is premised on that the compression ratio is reduced to the acceptable value in which the state element satisfies the predetermined requirement. Thus, even if the operating state of the lockup mechanism is moved into the lockup-on state, the reduction in drivability does not occur.

Incidentally, the "drive system" means the power train of the vehicle including at least the internal combustion engine and the transmission, and the efficiency in the drive system corresponds to an index value obtained by multiplying the thermal efficiency of the internal combustion engine by the transmission efficiency of the torque converter as a preferred form. The efficiency can preferably define the entire fuel consumption of the vehicle, so that it is also suitable as a judgment index.

In one aspect of the first vehicle control apparatus of the present invention in which the operating state of the lockup mechanism is changed on the basis of the predicted value in the drive system, the first controlling device changes the operating state into a lockup-on state if the operating condition of the vehicle including the load correspondence value corresponds to a predetermined cooperation lockup area in which a current value of the efficiency in the drive system is less than the predicted value, and the second controlling device reduces the compression ratio to the acceptable value if the operating state is changed into the lockup-on state because the operating condition corresponds to the cooperation lockup area.

According to this aspect, the first controlling device changes the operating state of the lockup mechanism into the lockup-on state if the operating condition of the vehicle corresponds to the cooperation lockup area in which the current value of the efficiency in the drive system (i.e. the value before the change) is less than the predicted value described above. Along with that, the compression ratio is reduced to the acceptable value by the second controlling device. Therefore, it is possible to optimally maintain the drivability and fuel consumption of the entire vehicle.

In one aspect of the first vehicle control apparatus of the present invention in which the operating state of the lockup mechanism is changed into the lockup-on state, the cooperation lockup area is an area in which the load correspondence value is less than the reference value in a coordinate system with the load correspondence value and a vehicle speed correspondence value of the vehicle as axis elements, and which is between a first area and a second area in a direction of the vehicle speed correspondence value, the compression ratio being a high compression ratio correspondence value and the operating state being in the lockup-off state in the first area, the compression ratio being the high compression ratio correspondence value and the operating state being in the lockup-on state in the second area.

According to this aspect, the position of the cooperation lockup area is clarified in a two-dimensional coordinate system in which the load correspondence value and the vehicle speed correspondence value are provided as the operating condition of the vehicle.

In one aspect of the first vehicle control apparatus of the present invention in which the operating state of the lockup mechanism is changed into the lockup-on state, the first controlling device returns the operating state to the lockup-off state if a change amount of the load correspondence value of the internal combustion engine is greater than or equal to the reference value in the cooperation lockup area, and the second controlling device increases the compression ratio with the return of the operating state into the lockup-off state.

In the cooperation lockup area, a high-dimensional balance can be achieved between the drivability and the fuel consumption. However, considering that it can be accompanied by the reduction in compression ratio with respect to a standard compression ratio, an insufficiency of acceleration can cause the reduction in drivability in a phase that the power performance is significantly required.

According to this aspect, if the change amount of the load correspondence value which correlates with the acceleration request of a driver (preferably, a time change amount and a change speed) is greater than or equal to the reference value, the operating state of the lockup mechanism is returned to the lockup-off state, and the compression ratio is controlled to be increased in tandem with the return. Therefore, it is possible to adapt even to a transient request, such as the acceleration request of a driver.

Incidentally, based on the purport of this aspect, obviously, such an operation aspect is also included that the first controlling device does not take the measure of reducing the compression ratio in the cooperation lockup area in the situation that the change amount is certainly greater than or equal to the reference value in the cooperation lockup area.

The above object of the present invention can be also achieved by a second vehicle control apparatus for controlling a vehicle provided, as a drive system, with: an internal combustion engine in which a compression ratio is variable; and a transmission which has a torque converter and a lockup mechanism between an input shaft and an engine output shaft of the internal combustion engine and which can change a ratio between a rotational speed of the input shaft and a rotational speed of an output shaft coupled with an axle, the vehicle control apparatus provided with: a first controlling device for changing the compression ratio in accordance with an operating condition of the vehicle; and a second controlling device for changing an operating state of the lockup mechanism in at least one portion of a case where the compression ratio is changed.

The second vehicle control apparatus of the present invention is an apparatus applied to the vehicle provided with the internal combustion engine and the transmission described above, as in the first vehicle control value.

According to the second vehicle control apparatus of the present invention, in its operation, the compression ratio of the internal combustion engine is controlled in accordance with the operating condition of the vehicle by the first controlling device, and the proper compression ratio is realized. Incidentally, the operating condition of the vehicle which can define the compression ratio can include, for example, the load correspondence value, the vehicle speed correspondence value described above, an engine rotational speed, or the like.

On the other hand, the second controlling device changes the operating state of the lockup mechanism in at least one portion of the period that the compression ratio is changed by the first controlling device.

The operating state of the lockup mechanism influences a driving force in addition to the fuel consumption performance and the performance associated with the NV described above or the like. More specifically, a torque amplification effect in the torque converter cannot be used in the lockup-on state, so that the torque to be supplied to the output shaft tends to be insufficient. Conversely, if the operating state of the lockup mechanism is changed in a binary manner, in multiple stages, or continuously, the power performance of the vehicle can be changed with respect to the compression ratio at the time point.

Therefore, according to the second vehicle control apparatus of the present invention, it is possible to maintain the good power performance of the vehicle in a wider range, by changing the operating state of the lockup mechanism in the process that the compression ratio is controlled in accordance with a predetermined criterion, thereby to perform their mutual cooperation.

In one aspect of the second vehicle control apparatus of the present invention, the first controlling device changes the compression ratio to be low or high in accordance with a large or small load correspondence value of the internal combustion engine as the operating condition, respectively, and the second controlling device changes the operating state into a lockup-off state if the compression ratio is changed to a value which is less than a reference value, if the operating state is in a lockup-on state and if the load correspondence value of the internal combustion engine is greater than a reference value.

The compression ratio of the internal combustion engine tends to induce the knocking and the torque variation as the compression ratio is higher. Thus, normally, as it comes to a higher rotation area and a higher load area, the compression ratio tends to be moved to a lower compression ratio side.

However, the driving force of the internal combustion engine becomes lower as the compression ratio is lower. Thus, if the operating state of the lockup mechanism is moved into the lockup-on state or is in the lockup-on state in the high rotation area or high load area of this type in which the power performance is significantly required, the insufficiency of the driving force may significantly reduce the drivability due to no torque amplification effect in the torque converter and due to the low compression ratio.

According to this aspect, the second controlling device changes the lockup mechanism into the lockup-off state if the compression ratio is made less than the reference value by the first controlling device in the case where the lockup mechanism is in the lockup-on state and the load correspondence value is greater than or equal to the reference value. The change to the lockup-off state brings the torque amplification effect by the torque converter, and it enables the driving force of the vehicle to be ensured as much as possible in the limited condition.

The operation and other advantages of the present invention will become more apparent from the embodiments explained below.

BEST MODE FOR CARRYING OUT THE INVENTION

Embodiments of the Invention

Hereinafter, the preferred embodiments of the present invention will be explained with reference to the drawings.

First Embodiment

<Structure of Embodiment>

Figure 1:
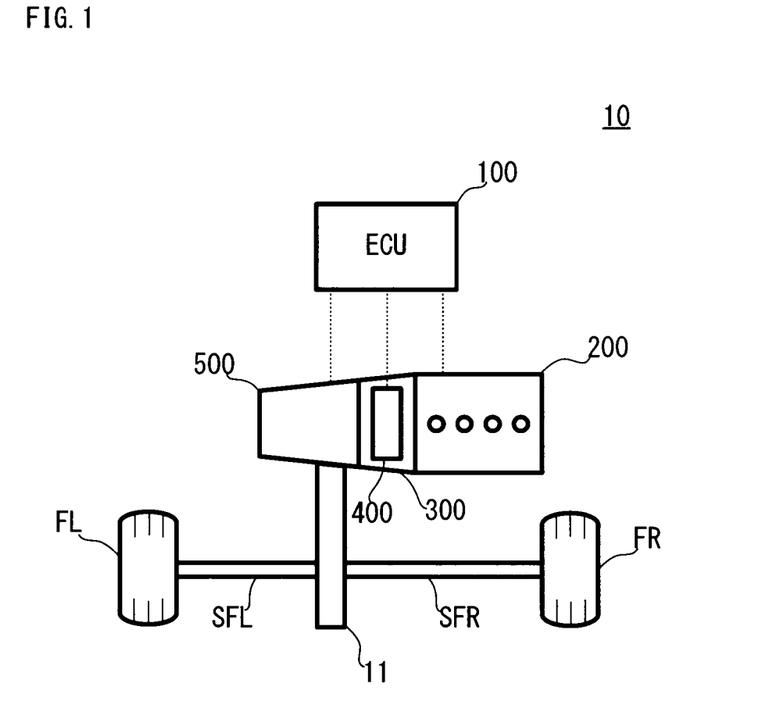
FIG. 1 is a schematic configuration diagram conceptually showing the structure of a vehicle in a first embodiment of the present invention.

Firstly, with reference to FIG. 1, the structure of a vehicle 10 in a first embodiment of the present invention will be explained. FIG. 1 is a schematic configuration diagram conceptually showing the structure of the vehicle 10.

In FIG. 1, the vehicle 10 is provided with: an ECU 100; an engine 200; a torque converter 300; a lockup clutch 400; and an ECT 500.

The ECU 100 is provided with a CPU (Central Processing Unit), a ROM (Read Only Memory), a RAM and the like. The ECU 100 is an electronic control unit capable of controlling all the operations of the vehicle 10. The ECU 100 is one example of the "vehicle control apparatus" of the present invention. The ECU 100 can perform driving control described later, in accordance with a control program stored in the ROM.

Figure 2:
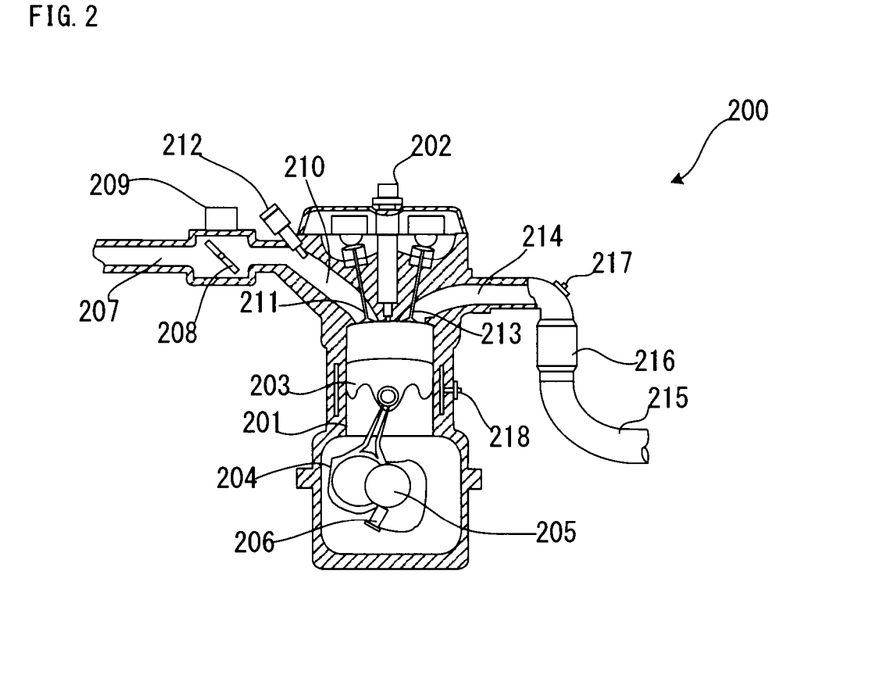
FIG. 2 is a schematic side cross sectional view showing an engine in the vehicle in FIG. 1.

The engine 200 functions as the main power source of the vehicle 10 and is an in-line four-cylinder gasoline engine as one example of the "internal combustion engine" of the present invention. Now with reference to FIG. 2, the detailed structure of the engine 200 will be explained. FIG. 2 is a schematic side cross sectional view showing the engine 200. Incidentally, in FIG. 2, the overlap points with FIG. 1 will carry the same reference numerals, and the explanation thereof will be omitted as occasion demands.

In FIG. 2, the engine 200 enables an air-fuel mixture to be combusted via an ignition operation by an ignition plug 202 within a cylinder 201 and can convert the reciprocating motion of a piston 203 generated in accordance with an explosive force by the combustion, to the rotary motion of a crankshaft 205 via a connecting rod 204.

In the vicinity of the crankshaft 205, there is placed a crank position sensor 206 for detecting the rotational position of the crankshaft 205 (i.e. a crank angle). The crank position sensor 206 is electrically connected to the ECU 100 (not illustrated), and an engine rotational speed Ne of the engine 200 is calculated on a crank angle signal outputted from the crank position sensor 206 in the ECU 100.

Incidentally, the engine 200 is an in-line four-cylinder gasoline engine in which four cylinders 201 are arranged in line in a perpendicular direction to the paper; however, the structures of the individual cylinders 201 are equal to each other, so that an explanation will be given on only one cylinder 201 in FIG. 2. Moreover, the number of cylinders, cylinder arrangement, the structure of an intake/exhaust system or the supply aspect of fuel, and the like in the internal combustion engine of the present invention are not limited to any aspects, at least as long as the compression ratio is variable, as described later.

Hereinafter, the structure of the main part of the engine 200 will be explained with one portion of its operations.

In the engine 200, the air sucked from the exterior (or intake air) is supplied through an intake tube 207 and an intake port 210 to the inside of the cylinder 201 in the opening of an intake valve 211. On the other hand, the fuel injection valve of an injector 212 is exposed in the intake port 210, and it is adapted to inject the fuel to the intake port 210. The fuel injected from the injector 212 is mixed with the intake air before or after the opening timing of the intake valve 211, to thereby make the aforementioned air-fuel mixture.

The fuel is stored in a not-illustrated fuel tank and is supplied to the injector 212 through a not-illustrated delivery pipe by the operation of a not-illustrated feed pump. The air-fuel mixture combusted in the cylinder 201 becomes an exhaust gas and is supplied to an exhaust tube 215 through an exhaust port 214 in the opening of an exhaust valve 213 which opens or closes in conjunction with the opening or closing of the intake valve 211.

In the exhaust tube 215, a ternary catalyst 216 is placed. The ternary catalyst 216 is adapted to purify each of CO (carbon monoxide), HC (hydrocarbon), and NOx (nitrogen oxide), emitted from the engine 200.

In the exhaust tube 215, there is placed an air-fuel ratio sensor 217 capable of detecting the exhaust air-fuel ratio of the engine 200. Moreover, in a water jacket placed in a cylinder block for accommodating the cylinder 201, a water temperature sensor 218 is disposed in order to detect a coolant temperature associated with a coolant (LLC) circulated and supplied to cool the engine 200. Each of the air-fuel ratio sensor 217 and the temperature sensor 218 is electrically connected to the ECU 100, and each of the detected air-fuel ratio and the detected coolant temperature is referred to by the ECU 100 as occasion demands.

On the other hand, on the upstream side of the intake port 210 in the intake tube 207, there is disposed a throttle valve 208 for adjusting an intake air amount associated with the intake air supplied through a not-illustrated cleaner. The throttle valve 208 is constructed such that the driving state thereof is controlled by a throttle valve motor 209, which is electrically connected to the ECU 100. Incidentally, the ECU 100 basically controls the throttle valve motor 209 to obtain a throttle opening degree according to the opening degree of an accelerator pedal not illustrated (i.e. accelerator opening degree Ta); however, it can also adjust the throttle opening degree without a driver's will through the operation control of the throttle valve motor 209. In other words, the throttle valve 208 is constructed as a kind of electronically-controlled throttle valve.

Incidentally, in the vicinity of the throttle valve 208, there is placed a not-illustrated throttle opening sensor capable of detecting a throttle opening degree thr which is the opening degree of the throttle valve 208. The throttle opening sensor is electrically connected to the ECU 100, and the detected throttle opening degree thr is referred to by the ECU 100 as occasion demands.

Here, the engine 200 in the first embodiment is constructed such that a compression ratio Rc is variable in a predetermined range. The compression ratio Rc is a ratio between an intake stroke volume and a combustion chamber volume; however, the engine structure for making the compression ratio Rc variable is not unique.

For example, in the engine 200, the length in a stroke direction of the cylinder block for accommodating the cylinder 201 may be variable in the intake stroke. In other words, in this case, the stroke of the piston 203 increases, so that the intake stroke volume increases and the compression ratio increases.

Moreover, in the engine 200, the top dead center portion of the piston 203 may be variable in the intake stroke. In this case, the intake stroke volume decreases and the combustion chamber volume increases, so that the compression ratio can be changed.

Incidentally, the engine 200 in the first embodiment enables the compression ratio to be variable not by the physical structure of the engine described above but by changing the IVO (Intake Valve Opening or valve opening period) of the intake valve 211. In other words, if the normal valve closing timing of the intake valve 211 is retarded to enlarge the IVO, the intake is blown back to the intake port side from the inside of the cylinder in one portion of a compression stroke. Thus, the intake air amount compressed in the compression stroke is reduced, and it is possible to obtain substantially the same effects as in the reduction in intake stroke volume.

Incidentally, the compressed intake air amount is substantially maximal if the intake valve 211 is opened in tandem with the end of an exhaust stroke and if the intake valve 211 is closed after the start of the compression stroke (if a type of supercharging effect by intake inertia is used). In other words, the compression in this case is a maximum compression ratio Rcmax of the engine 200, and the desired compression ratio Rc is realized by gradually retarding the valve closing timing of the intake valve 211. As described above, the engine 200 enables the compression ratio to be variable, basically by the control on the side of reducing the compression ratio. Thus, in the original physical structure, the engine 200 is set to obtain a higher compression ratio than in a normal engine (an engine in which the compression ratio is not variable).

On the other hand, due to a need to control the valve closing timing of the intake valve 211 not to be in conjunction with the exhaust valve 213, an electric drive variable valve timing apparatus is adopted for the engine 200. This apparatus is a type of cam by wire mechanism and has such a structure that the rotary phase of a cam as a rocking member for driving the intake valve 213 is changed by the driving force of an electric motor in a predetermined range.

Incidentally, it is obvious that a mechanism for making the variable valve timing of the intake valve 211 can adopt various known methods. For example, the engine 200 may be provided with a VVT (Variable Valve Timing apparatus) of a vane drive type, or it may have a cam drive mechanism of a so-called lost motion type.

Back in FIG. 1, the torque converter 300 is a torque transmitting apparatus connected to the crankshaft 205 of the engine 200. The torque converter 300 is a fluid transmitting apparatus capable of transmitting the rotation power of a pump impeller (not illustrated) connected to the input side (crankshaft 205 side) to a turbine runner (not illustrated) connected to the output side (ECT 500 side) as a rotation power, via an ATF (Automatic Transmission Fluid) and while amplifying a torque with a stator (not illustrated). In other words, an engine torque Te as torque of the engine 200 is transmitted to the ECT 500 via the torque converter 300. Incidentally, the input shaft of the ECT 500 is connected to the turbine runner placed on the output side of the torque converter 300.

The lockup clutch 400 is provided with a pair of engagement elements and can control a connection state between the pump impeller as the input side element of the torque converter 300 and the turbine runner as the output side element in accordance with the engagement state of the pair of engagement elements. The lockup clutch 400 is a known clutch apparatus of a hydraulic clutch type, as one example of the "lockup mechanism" of the present invention.

The engagement state of the pair of engagement elements of the lockup clutch 400 can be changed in a binary manner between a fastening state in which the engagement elements are fastened and a release state in which the engagement elements are mutually separated. If the engagement elements are in the fastening state, the pump impeller and the turbine runner are directly connected. In the state that the pump impeller and the turbine runner are directly connected, the function as a fluid clutch of the torque converter 300 described above disappears, ad the engine torque Te is inputted to the ECT 500 without a loss by the ATF.

Incidentally, a hydraulic driving apparatus for controlling the engagement state of the lockup clutch 400 is electrically connected to the ECU 100, and its operation state is controlled by the ECU 100. Moreover, the state that the pump impeller and the turbine runner are directly connected will be hereinafter expressed as a "lockup-on state", and the state that they are not connected will be hereinafter expressed as a "lockup-off state", as occasion demands.

The ECT 500 is an electronically-controlled transmission which have a plurality of transmission gear ratios as one example of the "transmission" of the present invention, provided with a plurality of friction engaging apparatuses (not illustrated) made of a plurality of clutch elements, a brake element, a one-way clutch element, and the like. The ECT 500 is electrically connected to the ECU 100. The engagement state of each of the friction engaging apparatuses is changed via driving control of various solenoids (not illustrated) or the like by the ECU 100, by which it is possible to obtain a plurality of transmission steps corresponding to a plurality of transmission gear ratios which are mutually different.

Moreover, the ECT 500 is provided with a not-illustrated rotation sensor, and it can detect an ECT output shaft rotational speed Nout, which is the rotational speed of the output shaft of the ECT 500. The rotation sensor is electrically connected to the ECU 100, and the output shaft rotational speed Nout of the ECT 500 is referred to by the ECU 100 as occasion demands.

Incidentally, the ECT 500 has an equivalent structure to that of a known electronically-controlled automatic transmission. The detailed illustration will be omitted, but the ECT 500 has six transmission steps of "1st", "2nd", "3rd", "4th", "5th", and "6th" in descending order of the gear ratio, as the transmission steps corresponding to the direction of forward movement of the vehicle 10. The larger transmission gear ratio can be obtained in descending order of the gear ratio. If the vehicle 10 moves forward, the ECU 100 can set the transmission gear ratio of the ECT 500 to a value corresponding to any of the transmission steps described above by controlling the engagement state of each friction engaging apparatus of the ECT 500.

The output shaft of the ECT 500 is coupled with a left front axle SFL and a right front axle SFR which are coupled with a left front wheel FL and a right front wheel FR as drive wheels, respectively.

<Operations of Embodiment>
<Details of Driving Control>

Figure 3:
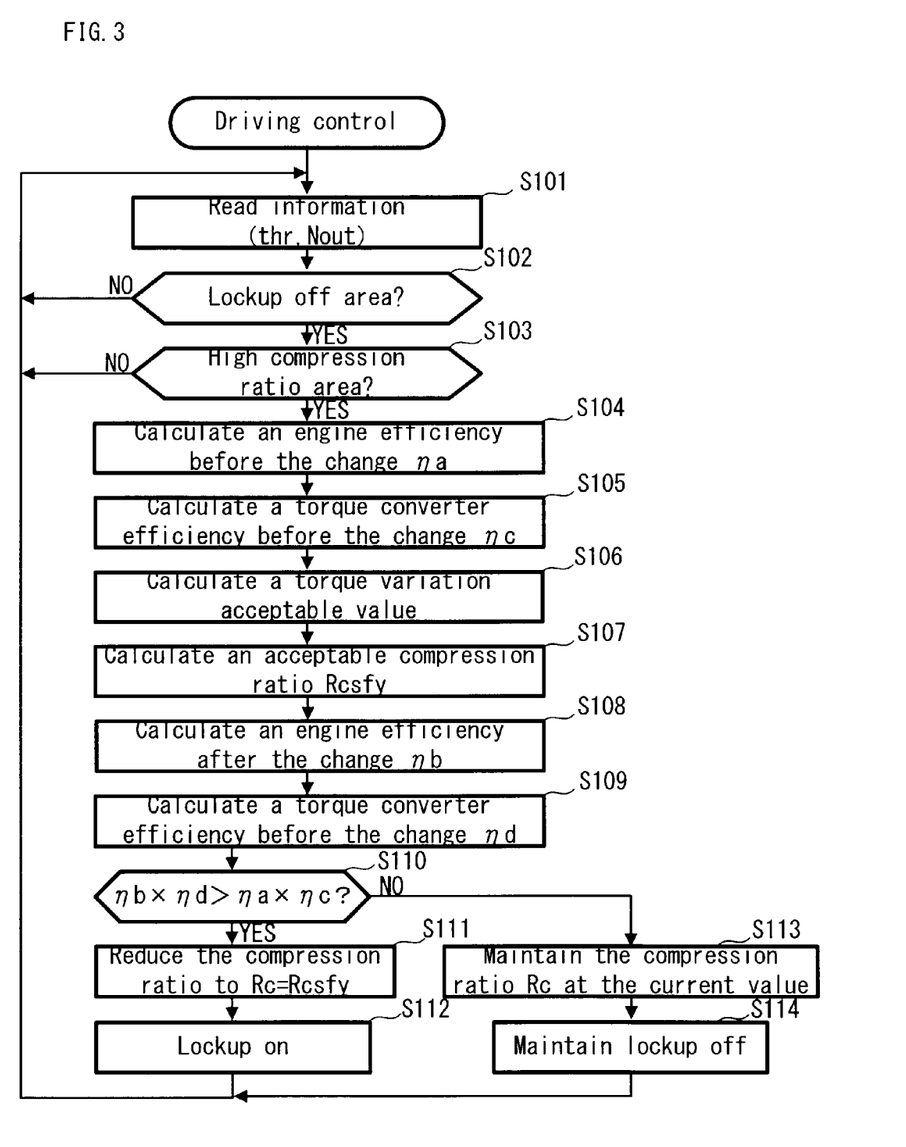
FIG. 3 is a flowchart showing driving control performed by an ECU in the vehicle in FIG. 1.

Firstly, with reference to FIG. 3, a flow of the driving control will be explained. FIG. 3 is a flowchart showing the driving control. Incidentally, the driving control is one example of the operations of the first vehicle control apparatus of the present invention, for improving the fuel consumption of the vehicle 10 by correcting the compression ratio Rc of the engine 200 in tandem with the lockup on timing of the lockup clutch 400 and enlarging the lockup area.

In FIG. 3, the ECU 100 reads various information required for the driving control (step S101). Specifically, the ECU 100 reads the throttle opening degree thr and the ECT output shaft rotational speed Nout. Incidentally, the throttle opening degree thr is one example of the "load correspondence value" of the present invention, and the ECT output shaft rotational speed Nout is one example of the "vehicle speed correspondence value" of the present invention. Moreover, each of them is one example of the "operating condition of the vehicle" of the present invention.

Then, the ECU 100 judges whether or not the operating point of the vehicle 100 corresponds to a lockup-off area, on the basis of the read throttle opening degree thr and the read ECT output shaft rotational speed Nout (step S102).

Here, in the first embodiment, the operating point of the vehicle 10 is defined on an operating point plane (one example of the "coordinate system" of the present invention) with the throttle opening degree thr on a vertical axis and the ECT output shaft rotational speed Nout on a horizontal axis. In other words, one coordinate point on the coordinate plane defined by one throttle opening degree thr and one ECT output shaft rotational speed Nout is treated as one operating point of the vehicle 10.

Whether the lockup clutch 400 is to adopt the lockup-on state or the lockup-off state as its operating state is defined by a lockup line LLK set on the operating point plane (described later). The lockup-off area is basically an area on the lower rotation side than the lockup line LLK. If the operating point of the vehicle 10 is already in a lockup-on area (the step S102: NO), the ECU 100 returns the process to the step S101.

On the other hand, if the operating point of the vehicle 10 is in the lockup-off area (the step S102: YES), the ECU 100 judges whether or not the operating point of the vehicle 10 corresponds to a high compression ratio area (step S103).

Incidentally, in order to prevent the explanation from being complicated, in the first embodiment, it is assumed that the compression ratio Rc of the engine 200 is changed in a binary manner between a low compression ratio RcL and a high compression ratio RcH. Of course, the compression ratio Rc may be changed in more stages or continuously.

The high compression ratio area is an area in which it is defined that the high compression ratio RcH is to be adopted as the compression ratio of the engine 200, and it is defined by a compression ratio change line LRc set on the operating point plane, as in the lockup clutch 400. The high compression ratio area is basically an area on the lower load side than the compression ratio change line LRc. If the operating point of the vehicle 10 already corresponds to a low compression ratio area (the step S103: NO), the ECU 100 returns the process to the step S103.

On the other hand, if the operating point of the vehicle 10 is in the high compression ratio area (the step S103: YES), the ECU 100 calculates an engine efficiency $\eta a$ before the change (step S104). The engine efficiency $\eta a$ before the change is used as one of the element values for defining the "current value of the efficiency in the drive system" of the present invention.

Figure 4:
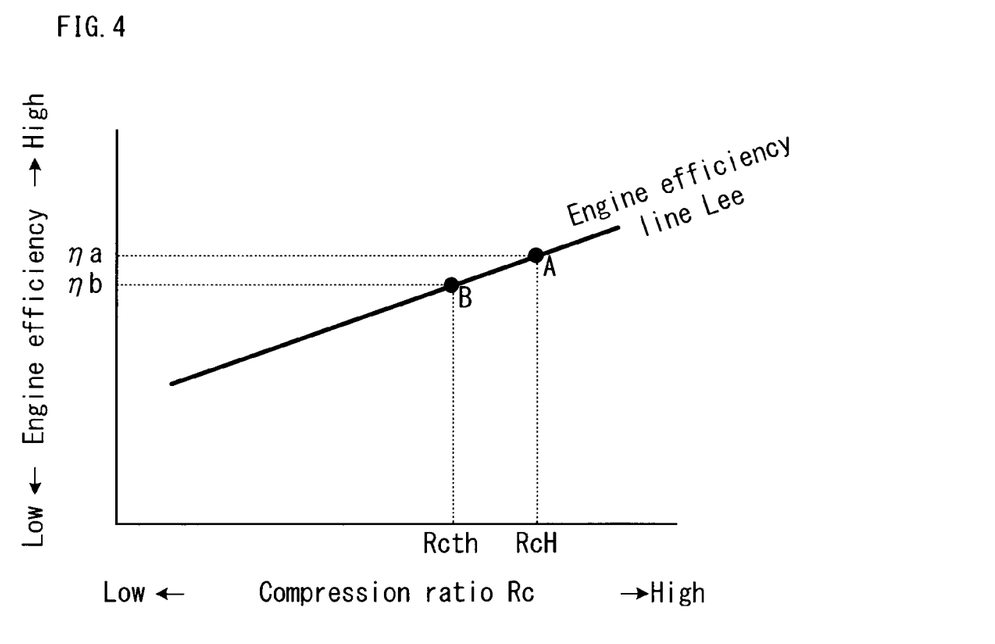
FIG. 4 is a view exemplifying a relation between a compression ratio and an engine efficiency in the driving control in FIG. 3.

Now, with reference to FIG. 4, the engine efficiency $\eta a$ before the change will be explained. FIG. 4 is a view exemplifying a relation between the compression ratio and the engine efficiency.

In FIG. 4, the horizontal axis shows the compression ratio Rc, and the vertical axis shows the engine efficiency. The engine efficiency is the thermal efficiency of the engine 200, and as it is higher, it means that the consumption efficiency of the fuel is higher, i.e. that the fuel efficiency is better. Moreover, in FIG. 5, an engine efficiency line Lee is defined. The engine efficiency line Lee is a line obtained by connecting the engine efficiencies each of which is for one compression ratio Rc.

Back in FIG. 3, in the step S104, the ECU 100 firstly refers to the relation in FIG. 4 and obtains the engine efficiency $\eta a$ before the change as an engine efficiency corresponding to a current compression ratio RcH (refer to a point A illustrated).

Then, the ECU 100 calculates a torque converter $\eta c$ before the change (step S105). The torque converter $\eta c$ before the change is used as another one of the element values for defining the "current value of the efficiency in the drive system" of the present invention.

Figure 5:
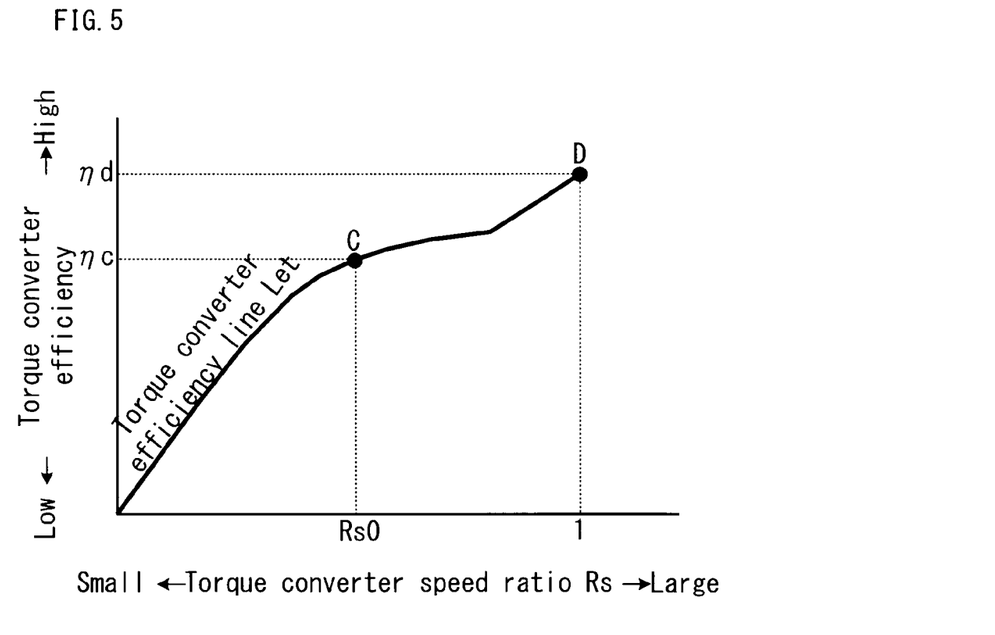
FIG. 5 is a view exemplifying a relation between a torque converter speed ratio and a torque converter efficiency in the driving control in FIG. 3.

Now, with reference to FIG. 5, the torque converter efficiency $\eta c$ before the change will be explained. FIG. 5 is a view exemplifying a relation between a torque converter speed ratio Rs and the torque converter efficiency. Incidentally, the torque converter speed ratio Rs is a rotation speed ratio between the pump impeller and the turbine runner, and it adopts 1 at the time of the lockup on in which they are mechanically directly connected (refer to a point D illustrated).

In FIG. 5, the horizontal axis shows the torque converter speed ratio Rs, and the vertical axis shows the torque converter efficiency. The torque converter efficiency is the transmission efficiency of a torque in the torque converter 300, and as it is higher, it means that the loss is less. Moreover, in FIG. 5, a torque converter efficiency line Let is defined. The a torque converter efficiency line Let is a line obtained by connecting the torque converter efficiencies each of which is for one torque converter ratio Rs.

Back in FIG. 3, in the step S105, the ECU 100 refers to the relation in FIG. 5 and obtains the torque converter efficiency $\eta c$ before the change as a torque converter efficiency corresponding to a current torque converter speed ratio Rs (refer to a point C illustrated).

Then, the ECU 100 calculates a torque variation acceptable value (step S106). The torque variation acceptable value is a torque variation index value corresponding to a limit value which allows the noise and vibration of the vehicle 10 to be in an acceptable range, or a value obtained by adding a constant margin to the limit value, if the lockup clutch 400 is moved into the lockup-on state in the operating condition of the vehicle 10 at the current time point. Incidentally, a torque variation index value Tc is a standardized index value for defining the degree of the torque variation of the engine 200, and as it is larger, it means that the torque variation is larger. The torque variation acceptable value is stored in a ROM in advance as a variable value according to the operating condition of the vehicle 10.

Figure 6:
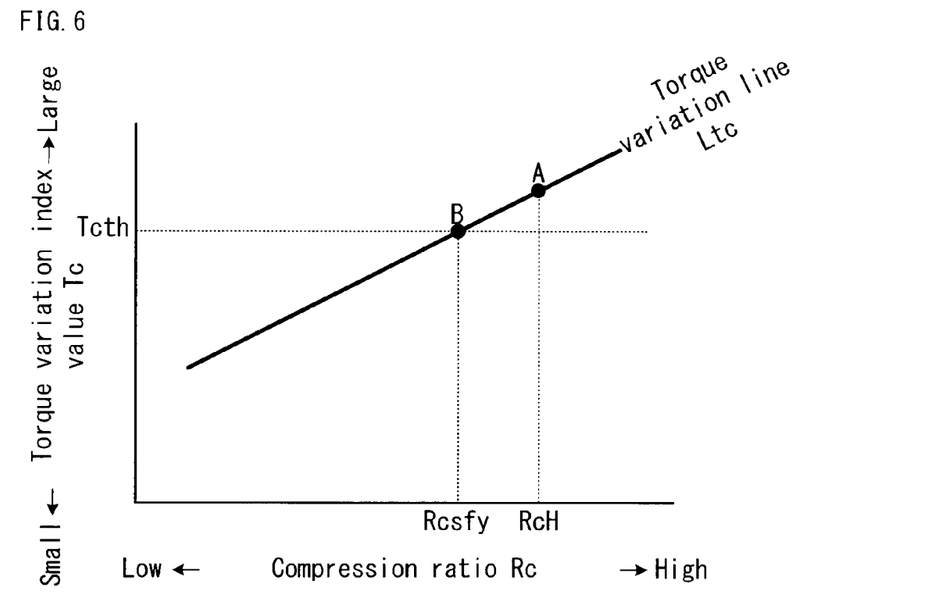
FIG. 6 is a view exemplifying a relation between the compression ratio and a torque variation index value in the driving control in FIG. 3.

If calculating the torque variation acceptable value, the ECU 100 calculates an acceptable compression ratio Rcsfy (step S107). The acceptable compression ratio Rcsfy is a compression ratio of the engine 200 corresponding to the torque variation acceptable value. Now, with reference to FIG. 6, the torque variation acceptable value will be explained. FIG. 6 is a view exemplifying a relation between the compression ratio and the torque variation index value in the vehicle 10. Incidentally, in FIG. 6, the overlap points with FIG. 4 will carry the same reference numerals, and the explanation thereof will be omitted as occasion demands.

In FIG. 6, the horizontal axis shows the compression ratio Rc, and the vertical axis shows the torque variation index value Tc. Moreover, in FIG. 6, a torque variation line Ltc is defined. The torque variation line Ltc is a line obtained by connecting the torque variation index values each of which is for one compression ratio Rc.

In the step S107 in FIG. 3, the ECU 100 refers to the relation in FIG. 6 and obtains the value of the compression ratio Rc (refer to a point B illustrated) required when the torque variation index value is suppressed to a torque variation acceptable value Tcth, as the acceptable compression ratio Rcsfy.

Back in FIG. 3, if calculating the acceptable compression ratio Rcsfy, the ECU 100 calculates an engine efficiency $\eta b$ after the change (step S108). The engine efficiency $\eta b$ after the change is an engine efficiency corresponding to the acceptable compression ratio Rcsfy, and it is the engine efficiency corresponding to the point B with reference to FIG. 4. Incidentally, the engine efficiency $\eta b$ after the change is one element value for defining the "predicted value of the efficiency in the drive system if the compression ratio is lowered to an acceptable value determined such that a state element satisfies a predetermined requirement" in the present invention.

Then, the ECU 100 calculates a torque converter efficiency $\eta d$ after the change (step S109). The torque converter efficiency $\eta d$ after the change is a torque converter efficiency at the time of lockup on; namely, it is "1" in the first embodiment. Incidentally, the torque converter efficiency $\eta d$ after the change is another element value for defining the "predicted value of the efficiency in the drive system if the compression ratio is lowered to an acceptable value determined such that a state element satisfies a predetermined requirement" in the present invention.

If they are obtained, the ECU 100 judges whether or not $\eta b \times \eta d$ is greater than $\eta a \times \eta c$ (step S110). Incidentally, $\eta b \times \eta d$ is one example of the "predicted value of the efficiency in the drive system" of the present invention, and $\eta a \times \eta c$ is one example of the "current value of the efficiency in the drive system" of the present invention. In other words, the step S110 is a process of judging whether or not the fuel consumption as the entire vehicle 10 is improved if the compression ratio Rc of the engine 200 is reduced from the current compression ratio RcH to the acceptable compression ratio Rcsfy corresponding to the torque variation acceptable value Rcth.

As a result in the step S110, if the predicted value is less than or equal to the current value (the step S110: NO), i.e. if the effect of fuel improvement cannot be obtained even by reducing the compression ratio to move the lockup clutch 400 into the lockup-on state, the ECU 100 maintains the compression ratio Rc at the current value (step S113), and continues the lockup-off state associated with the lockup clutch 400 (step S114).

On the other hand, if the predicted value is greater than the current value (the step S110: YES), i.e. if the effect of fuel improvement can be obtained by reducing the compression ratio to move the lockup clutch 400 into the lockup-on state, the ECU 100 reduces the compression ratio Rc from the current value to the acceptable compression ratio Rcsfy (step S111), and changes the lockup clutch 400 into the lockup-on state (step S112).

If the step S112 or the step S114 is performed, the process is returned to the step S101, and a series of the process operations is repeated. The driving control is performed as described above.

Figure 7:
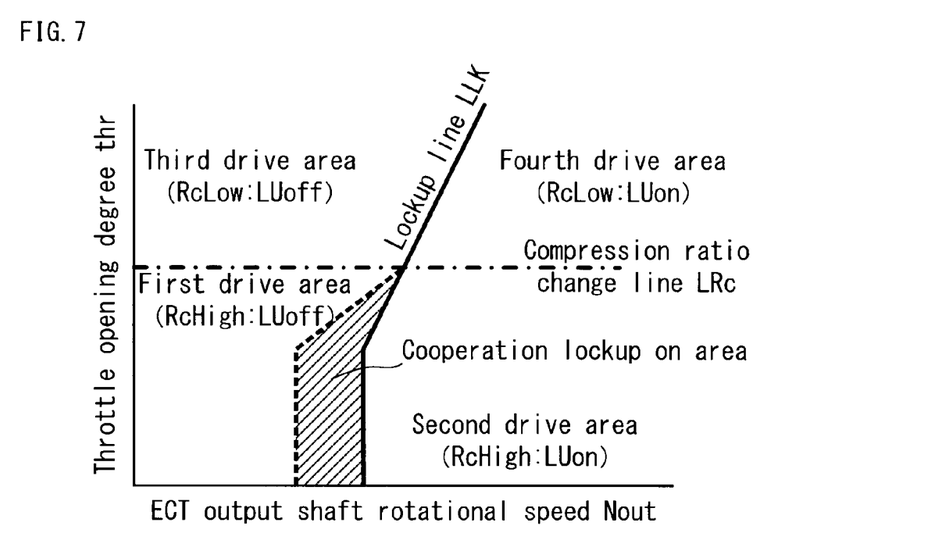
FIG. 7 is a view visually explaining a cooperation lockup-on area, according to the effects of the driving control in FIG. 3.

Now, the effects of the driving control will be visually explained with reference to FIG. 7. FIG. 7 is a schematic view showing the aforementioned operating point plane. Incidentally, in FIG. 7, the overlap points with the aforementioned explanation will carry the same reference numerals, and the explanation thereof will be omitted as occasion demands.

In FIG. 7, the operating point plane with the throttle opening degree thr and the ECT output shaft rotational speed Nout as the axis elements described above is shown, and the aforementioned lockup line LLK is shown in a solid line illustrated. Moreover, the aforementioned compression ratio change line LRc is shown in a chain line illustrated. Incidentally, the throttle opening degree thr for defining the compression ratio change line LRc is one example of the "reference value" of the "load correspondence value" of the present invention.

Here, the operating point plane is divided into four areas by the compression ratio change line LRc and the lockup line LLK: a first drive area which is an area on the lower load side than the compression ratio change line LRc and on the lower rotation side than the lockup line LLK; a second drive area which is an area on the lower load side than the compression ratio change line LRc and on the higher rotation side than the lockup line LLK; a third drive area which is an area on the higher load side than the compression ratio change line LRc and on the lower rotation side than the lockup line LLK; and a fourth drive area which is an area on the higher load side than the compression ratio change line LRc and on the higher rotation side than the lockup line LLK.

If each drive area is defined in this manner, then, in a case where the driving control in the first embodiment is not performed when the lockup clutch 400 is moved into the lockup-on state on the lower load side than the compression ratio change line LRc, the lockup on can be performed only in the second drive area.

On the other hand, the magnitude relation between the predicted value and the current value in the drive system described above is not unique, and the predicted value exceeds the current value in some cases. However, if there is no concept of the mutual cooperation between the change in the compression ratio Rc and the lockup control of the lockup clutch 400, the efficiency of the drive system maintains at the current value even in the operating point area in which the predicted value exceeds the current value, and the opportunity that the fuel consumption of the vehicle 10 can be improved would be wasted.

Here, particularly in the first embodiment, if the prediction that the predicted value exceeds the current value is made by the comparison judgment process for the current value and the predicted value described above, the compression ratio Rc is corrected to the reduction side with respect to the reference value set in advance, and the lockup clutch 400 is moved into the lockup-on state.

Here, if such an area that the lockup on is realized by the cooperation with the compression ratio is defined as a cooperation lockup-on area, the cooperation lockup-on area is a hatched area illustrated. In other words, the cooperation lockup-on area exists in a significant range between the first drive area and the second drive area. The cooperation lockup-on area is an area in which the fuel consumption of the vehicle 10 can be improved in comparison with a case where there is taken no measure that is similar to the driving control in the first embodiment.

As described above, according to the first embodiment, by making the control of the operating state of the lockup clutch 400 and the compression ratio control cooperate with each other, it is possible to enlarge the lockup-on area by an amount corresponding to the cooperation lockup-on area. Moreover, it is possible to improve the fuel consumption of the vehicle 10 by efficiently using the virtue of making the compression ratio variable in the engine 200 as an internal combustion engine of a variable compression ratio type.

Incidentally, in the first embodiment, it is constructed such that the cooperation lockup-on area exemplified in FIG. 7 is obtained at each time by comparing the predicted value and the current value; however, it is obvious that the same benefits can be received even by quantifying the relation exemplified in FIG. 7 and holding it as a map or the like.

Second Embodiment

Figure 8:
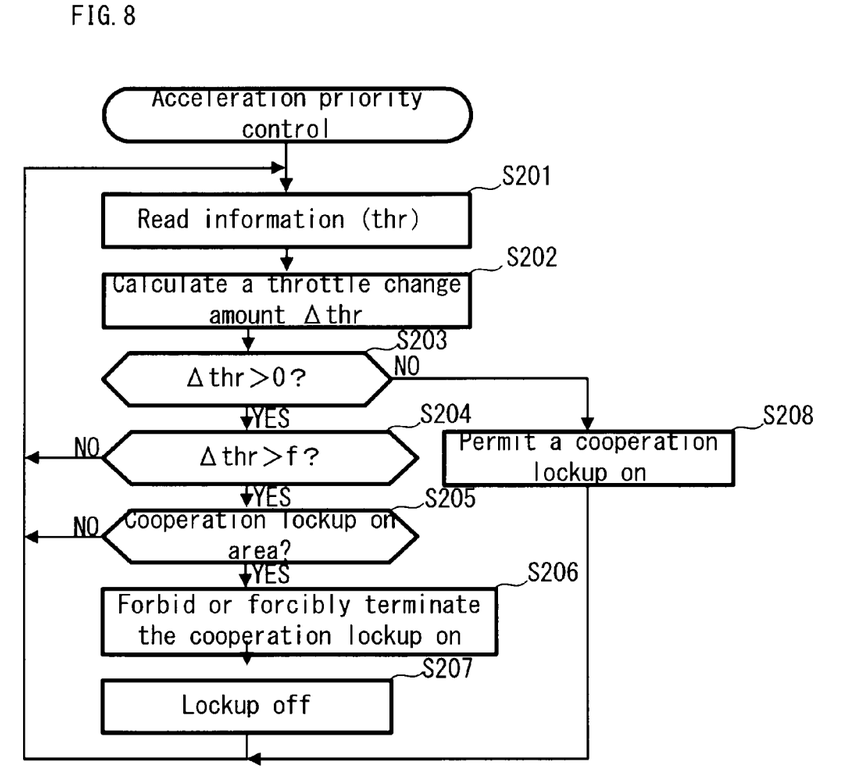
FIG. 8 is a flowchart showing acceleration priority control in a second embodiment of the present invention.

In the driving control exemplified in the first embodiment, the lockup clutch 400 is changed into the lockup-on state uniformly in the cooperation lockup-on area. However, a lockup on operation in the cooperation lockup-on area sacrifices not a little acceleration performance of the vehicle 10 as it is accompanied by a reduction in compression ratio. Now, an explanation will be given on the second embodiment of the present invention in which the acceleration performance can be ensured, with reference to FIG. 8. FIG. 8 is a flowchart showing acceleration priority control in the second embodiment of the present invention.

In FIG. 8, the ECU 100 reads information required when the acceleration priority control is performed (step S201). Specifically, the throttle opening degree thr is read. Then, the ECU 100 calculates a throttle change amount $\Delta thr$ (step S202). The throttle change amount $\Delta thr$ is a deviation between the current value and the previous value of the throttle opening degree thr, and if the read period of the information in the step S201 is constant, then, namely, it is synonymous with the change speed of the throttle opening degree.

If calculating the throttle change amount $\Delta thr$, the ECU 100 judges whether or not the throttle change amount $\Delta thr$ is greater than zero (step S203). Incidentally, the throttle change amount $\Delta thr$ can adopt a positive or negative value. If the throttle change amount Δthr adopts the negative value, a speed reduction request is made for the vehicle 100.

If the throttle change amount Δthr adopts zero or the negative value (the step S203: NO), the ECU 100 permits a cooperation lockup on operation (step S208) and returns the process to the step S201.

On the other hand, if the throttle change amount Δthr adopts the positive value (the step S203: YES), the ECU 100 further judges whether or not the throttle change amount Δthr is greater than a reference value f (step S204). If the throttle change amount t thr is less than or equal to the reference value f (the step S204: NO), the ECU 100 returns the process to the step S201 and repeats a series of the process operations. Incidentally, the reference value f is a compatible value and is set to a border value in which a reduction in acceleration performance by the cooperation lockup on can cause a reduction in drivability.

If the throttle change amount Δthr is greater than the reference value (the step S204: YES), the ECU 100 judges whether or not the current operating point of the vehicle corresponds to the cooperation lockup-on area (step S205). If the current operating point of the vehicle does not correspond to the cooperation lockup-on area (the step S205: NO), the ECU 100 returns the process to the step S201 and repeats a series of the process operations.

If the operating point of the vehicle 10 corresponds to the cooperation lockup-on area (the step S205: YES), the ECU 100 forbids or forcibly terminates the cooperation lockup on operation (step S206) and also changes the operating state of the lockup clutch 400 into the lockup-off state (step S207). Incidentally, the compression ratio Rc reduced and corrected with the lockup off is returned to the high compression ratio RcH. If the step S207 is performed, the process is returned to the step S201 and a series of the process operations is repeated. The acceleration priority control is performed as described above.

Figure 9:
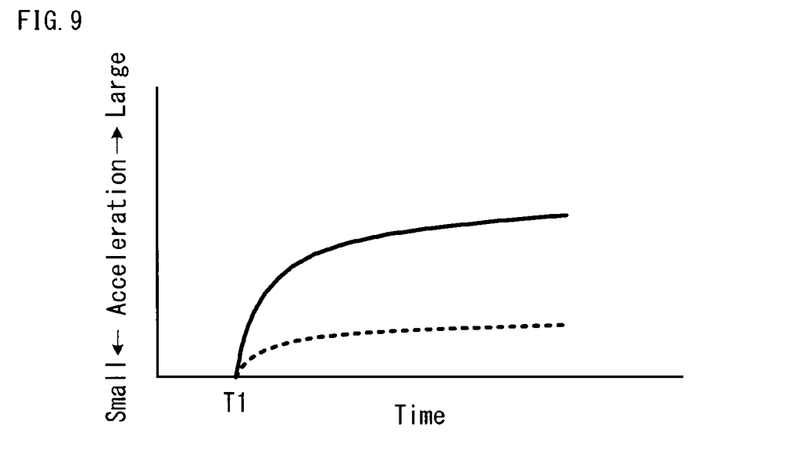
FIG. 9 is a view exemplifying one time transition of acceleration of the vehicle after a time point of making an acceleration request, according to the effects of the acceleration priority control in FIG. 8.

Now, with reference to FIG. 9, the effect of the acceleration priority control will be explained. FIG. 9 is a view exemplifying one time transition of the acceleration of the vehicle at the time of making an acceleration request.

In FIG. 9, the vertical axis shows the acceleration, and the horizontal axis shows time. It is assumed that the acceleration request is made at a time point T1 (i.e. it is assumed that the throttle change amount Δthr>f). In this case, in control of fuel consumption efficiency priority that is similar to the first embodiment, a change in the acceleration with time is slow as exemplified in a dashed line illustrated. This is caused by a torque reduction due to the reduction in compression ratio of the engine 200 to the acceptable compression ratio Rcsfy, and it is also caused by that there is no torque amplification effect in the torque converter 300.

In contrast, if the acceleration priority control in the second embodiment is applied, the rising of the acceleration after the time point of making the acceleration request is quick as shown in a solid line illustrated, so that it is possible to provide a desired acceleration feel.

As described above, according to the acceleration priority control, the throttle change amount Δthr is referred to, and if the acceleration request is made for the vehicle 10, the cooperation lockup on operation (lockup on and compression ratio reduction) in the cooperation lockup-on area is forcibly terminated, or the subsequent implementation is forbidden. Thus, the reduction in drivability (deviation from a driver's will) caused by uniformly performing the driving control of fuel consumption priority in the situation that the acceleration is prioritized over the fuel consumption is suppressed, to thereby ensure preferable drivability.

Third Embodiment

Figure 10:
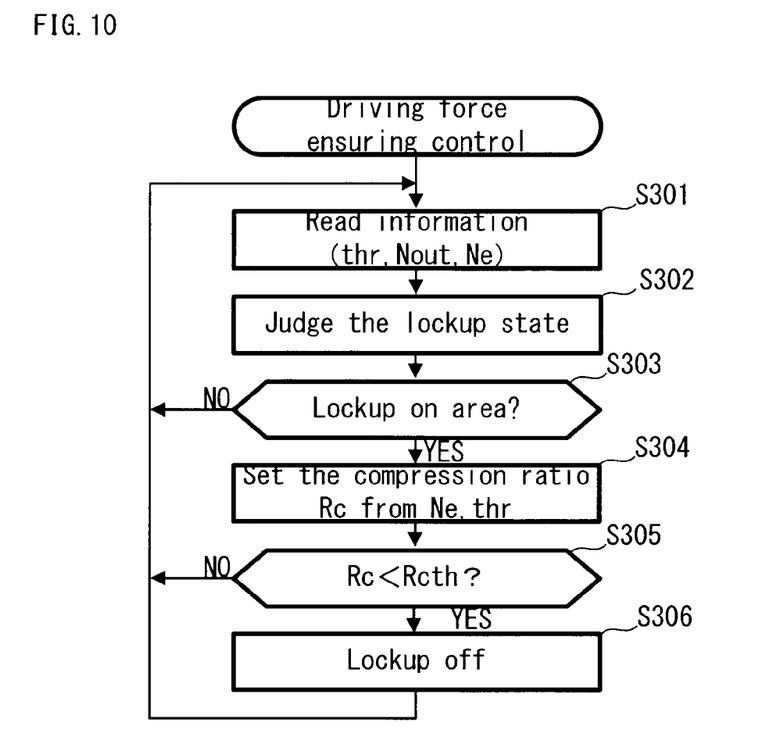
FIG. 10 is a flowchart showing driving force ensuring control in a third embodiment of the present invention.

The aspect of making the compression ratio Rc of the engine 200 and the change in the operating state of the lockup clutch 400 cooperate with each other is not limited to making the compression ratio control cooperate with the control of the change in the operating state of the lockup clutch 400, as in the first and second embodiments. Here, the third embodiment of the present invention based on the concept will be explained. Firstly, with reference to FIG. 10, an explanation will be given on the details of driving force ensuring control in the third embodiment of the present invention. FIG. 10 is a flowchart showing the driving force ensuring control in the third embodiment of the present invention. Incidentally, the driving force ensuring control is control in which it is made to cooperate with the change in the operating state of the lockup clutch 400 on the premise of the compression ratio control of the engine 200; namely, it is one example of the operations of the second vehicle control apparatus of the present invention.

Incidentally, the vehicle structure in the third embodiment is not different from that of the vehicle 10 in the first and second embodiments.

In FIG. 10, the ECU 100 reads various information required for the driving force ensuring control (step S301). Specifically, the throttle opening degree thr, the ECU output shaft rotational speed Nout and the engine rotational speed Ne area read.

Then, the ECU 100 judges the lockup state (operating state) of the lockup clutch 400 (step S302) and judges whether or not the lockup clutch 400 is in the lockup-on state (step S303). If the lockup clutch 400 is in the lockup-off state (the step S303: NO), the ECU 100 returns the process to the step S301.

If the lockup clutch 400 is in the lockup-on state (the step S303: YES), the ECU 100 sets the compression ratio Rc of the engine 200 on the basis of the engine rotational speed Ne and the throttle opening degree thr read in the step S301 (step S304). If setting the compression ratio Rc, the ECU 100 judges whether or not the set compression ratio is less than a reference value Rcth (step S305).

Figure 11:
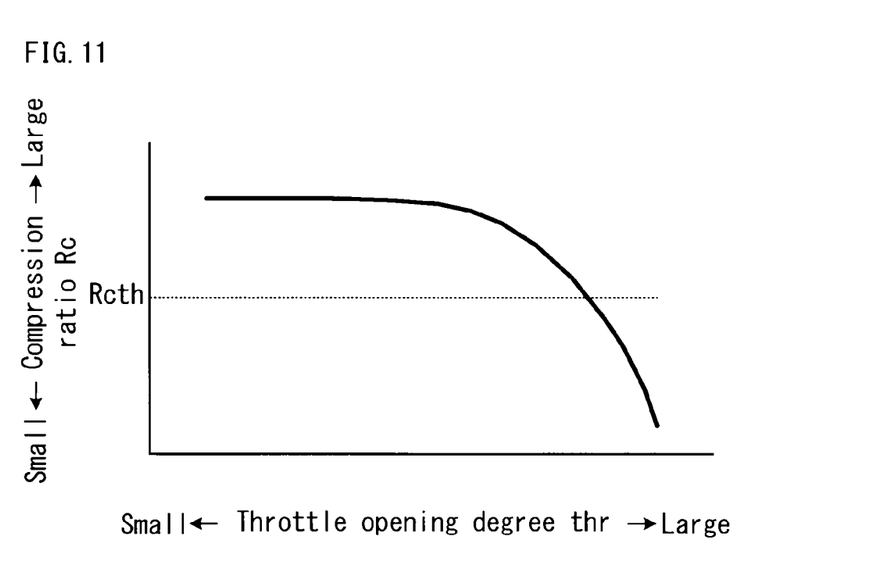
FIG. 11 is a view exemplifying a relation between a throttle opening degree and the compression ratio in the driving force ensuring control.

Now, with reference to FIG. 11, the reference value Rcth will be explained. FIG. 11 is a view exemplifying a relation between the throttle opening degree thr and the compression ratio.

In FIG. 11, the vertical axis shows the compression ratio Rc, and the horizontal axis shows the throttle opening degree thr. Here, the trajectory of the compression ratio Rc of the engine 200 with respect to the throttle opening degree thr is as shown in a solid line illustrated. As the throttle opening degree thr increases, i.e. as the engine 200 moves into a higher load state, the compression ratio Rc decreases. This is because knocking and torque variation tend to occur in a higher load area, and there is nothing but to reduce the compression ratio Rc in consideration of the combustibility and durability of the engine 200 and the amenity of the vehicle 10.

On one hand, a reduction in compression ratio Rc leads to a reduction in engine torque, as the output of the engine 200. On the other hand, an increase in throttle opening degree thr means an increase in request acceleration. Therefore, in the relation exemplified in FIG. 11, the engine torque reduced for the increased request acceleration causes an insufficiency of the driving force which can be actualized as the reduction in drivability. The compression ratio Rc corresponding to the insufficiency of the driving force which can be actualized as the reduction in drivability is namely the reference value Rcth.

Incidentally, as is clear from FIG. 11, if the compression ratio Rc adopts the reference value Rcth, the throttle opening degree thr is also in the high load area, and the condition of being greater than or equal to the "reference value" in the present invention is also satisfied.

Back in FIG. 10, if the set compression ratio is greater than or equal to the reference value Rcth (step S305: NO), the ECU 100 judges that the driving force is in an acceptable range and returns the process to the step S301. On the other hand, if the set compression ratio is less than the reference value Rcth (step S305: YES), the ECu 100 changes the lockup clutch 400 which is in the lockup-on state, into the lockup-off state (step S306). If the step S306 is performed, the process is returned to the step S301, and a series of the process operations is repeated.

As described above, according to the driving force ensuring control, the lockup clutch 400 cooperates in the area that the compression ratio is less than the reference value Rcth, and the operating state in which the lockup-on state is originally to be adopted is changed into the lockup-off state. As a result, the torque amplification effect in the torque converter 300 is restored, and the acceleration performance can be ensured by compensating an insufficiency of the engine torque due to the reduction in compression ratio. Eventually, the reduction in drivability can be suppressed.

As exemplified in the first to third embodiments, in the structure provided with the lockup clutch 400 (lockup mechanism) and the engine 200 (internal combustion engine of a variable compression ratio type), it is possible to further improve, e.g., the fuel consumption and the power performance (drivability) by the cooperation between the operating state of the lockup clutch 400 and the compression ratio as occasion demands. The benefits particular to the present application dominate an apparatus based on any other technical idea without having such a technical idea of mutual cooperation control.

Incidentally, in each of the embodiments described above, the throttle opening degree thr is used as the "load correspondence value" of the present invention. However, it is merely one example, and an accelerator opening degree and an intake air amount may be used as the load correspondence value. Moreover, in each of the embodiments described above, the ECT output shaft rotational speed Nout is used as the "vehicle speed correspondence value" of the present invention. However, it is merely one example, and a vehicle speed itself may be used as the vehicle speed correspondence value.

Incidentally, in the first and second embodiments, in order to prevent the explanation from being complicated, the compression ratio is change in a binary manner between the low compression ratio RcL and the high compression ratio RcH. However, this is merely one example, and the compression ratio Rc may be continuously variable, for example, in accordance with the throttle opening degree thr and the engine rotational speed Ne, as exemplified in the third embodiment. In any case, the cooperation lockup-on area exemplified in FIG. 7 is not significantly changed.

Incidentally, in the scope of claims, description and drawings, "greater than or equal to" and "less than" are concepts that can be easily replaced by "greater than" and "less than or equal to", respectively, depending on the setting of the reference value, and it is apparent that they are not accompanied by unnecessary restriction.

The present invention is not limited to the aforementioned embodiments, but various changes may be made, if desired, without departing from the essence or spirit of the invention which can be read from the claims and the entire specification. A vehicle control apparatus, which involves such changes, is also intended to be within the technical scope of the present invention.

INDUSTRIAL APPLICABILITY

The present invention can be applied to a vehicle provided with: an internal combustion engine in which a compression ratio is variable; and a transmission having a lockup mechanism.

DESCRIPTION OF REFERENCE CODES 10 vehicle
100 ECU
200 engine
201 cylinder
203 piston
205 crankshaft
207 injector
300 torque converter
400 lockup clutch
500 ECT

The invention claimed is:

1. A vehicle control apparatus for controlling a vehicle comprising, as a drive system: an internal combustion engine in which a compression ratio is variable; and a transmission which has a torque converter and a lockup mechanism between an input shaft and an engine output shaft of the internal combustion engine and which can change a ratio between a rotational speed of the input shaft and a rotational speed of an output shaft coupled with an axle, said vehicle control apparatus comprising:
a first controlling device for changing an operating state of the lockup mechanism in accordance with an operating condition of the vehicle; and
a second controlling device for changing the compression ratio in at least one portion of a case where the operating state is changed.

2. The vehicle control apparatus according to claim 1, wherein said second controlling device reduces the compression ratio if the operating state is changed into a lockup-on state in an area in which a load correspondence value of the internal combustion engine is less than a reference value as the operating condition.

3. The vehicle control apparatus according to claim 1, wherein said first controlling device changes the operating state of the lockup mechanism such that a state element including at least one of vibration and noise which occur in the vehicle satisfies a predetermined requirement.

4. The vehicle control apparatus according to claim 3, wherein said first controlling device changes the operating state on the basis of a predicted value of an efficiency in the drive system if the compression ratio is reduced to an acceptable value determined such that the state element satisfies the predetermined requirement in an area in which a load correspondence value of the internal combustion engine is less than a reference value.

5. The vehicle control apparatus according to claim 4, wherein
said first controlling device changes the operating state into a lockup-on state if the operating condition of the vehicle including the load correspondence value corresponds to a predetermined cooperation lockup area in which a current value of the efficiency in the drive system is less than the predicted value, and said second controlling device reduces the compression ratio to the acceptable value if the operating state is changed into the lockup-on state because the operating condition corresponds to the cooperation lockup area.

6. The vehicle control apparatus according to claim 5, wherein the cooperation lockup area is an area in which the load correspondence value is less than the reference value in a coordinate system with the load correspondence value and a vehicle speed correspondence value of the vehicle as axis elements, and which is between a first area and a second area in a direction of the vehicle speed correspondence value, the compression ratio being a high compression ratio correspondence value and the operating state being in the lockup-off state in the first area, the compression ratio being the high compression ratio correspondence value and the operating state being in the lockup-on state in the second area.

7. The vehicle control apparatus according to claim 5, wherein
said first controlling device returns the operating state to the lockup-off state if a change amount of the load correspondence value of the internal combustion engine is greater than or equal to the reference value in the cooperation lockup area, and
said second controlling device increases the compression ratio with the return of the operating state into the lockup-off state.

8. A vehicle control apparatus for controlling a vehicle comprising, as a drive system: an internal combustion engine in which a compression ratio is variable; and a transmission which has a torque converter and a lockup mechanism between an input shaft and an engine output shaft of the internal combustion engine and which can change a ratio between a rotational speed of the input shaft and a rotational speed of an output shaft coupled with an axle, said vehicle control apparatus comprising:
a first controlling device for changing the compression ratio in accordance with an operating condition of the vehicle; and
a second controlling device for changing an operating state of the lockup mechanism in at least one portion of a case where the compression ratio is changed.

9. The vehicle control apparatus according to claim 8, wherein
said first controlling device changes the compression ratio to be low or high in accordance with a large or small load correspondence value of the internal combustion engine as the operating condition, respectively, and
said second controlling device changes the operating state into a lockup-off state if the compression ratio is changed to a value which is less than a reference value, if the operating state is in a lockup-on state and if the load correspondence value of the internal combustion engine is greater than a reference value.

* * * * *